United States Patent [19]

Furuyama et al.

[11] Patent Number: 4,752,698

[45] Date of Patent: Jun. 21, 1988

[54] EMERGENCY SUPERVISORY SYSTEM

[75] Inventors: Akira Furuyama, Atsugi; Mitsuhiro Kurimoto, Machida; Yoshinori Kojima; Naoya Matsuoka, both of Yokohama; Sadataka Yuchi, Sagamihara; Louis Fournier, Kawasaki; Hiroaki Tsuru, Sagamihara, all of Japan

[73] Assignee: Hochiki Corp., Tokyo, Japan

[21] Appl. No.: 887,237

[22] Filed: Jul. 21, 1986

[30] Foreign Application Priority Data

Jul. 19, 1985 [JP] Japan ............................... 60-159921

[51] Int. Cl.[4] ............................................ H04Q 9/00

[52] U.S. Cl. .................................... 307/116; 307/151; 340/825.05; 340/825.16; 370/88; 364/492

[58] Field of Search ....................... 307/34, 35, 37, 38, 307/39, 40, 41, 116, 115; 370/53, 55, 57, 58, 67, 89, 86, 88, 87, 85; 340/825.06, 504, 825.05, 507, 825.13, 508, 825.12, 825.18, 310 A, 310 R; 364/492, 493; 361/41, 93, 90, 92

[56] References Cited

U.S. PATENT DOCUMENTS

| | | | |
|---|---|---|---|
| Re. 28,958 | 9/1976 | Zafiropulo et al. | 340/825.05 X |
| 3,569,635 | 3/1971 | Bloch | 340/825.05 |
| 3,651,284 | 3/1972 | Maione | 340/825.16 |
| 3,652,798 | 3/1972 | McNeilly et al. | 370/88 X |
| 3,716,834 | 2/1973 | Adams | 340/518 X |
| 4,228,476 | 10/1980 | Okita et al. | 364/492 X |
| 4,274,043 | 6/1981 | Heitz | 307/151 X |
| 4,357,545 | 11/1982 | LeGrand et al. | 307/64 |
| 4,516,121 | 5/1985 | Moriyama et al. | 340/825.05 |
| 4,541,031 | 9/1985 | Ibbetson | 340/825.16 X |
| 4,567,482 | 1/1986 | Dolsen et al. | 340/825.05 |
| 4,568,919 | 2/1986 | Muggli et al. | 340/505 X |
| 4,583,088 | 4/1986 | Bux et al. | 340/825.05 X |
| 4,612,534 | 9/1986 | Buehler et al. | 340/508 X |

FOREIGN PATENT DOCUMENTS 0101172 2/1984 European Pat. Off. .

*Primary Examiner*—William M. Shoop, Jr.
*Assistant Examiner*—Paul Ip
*Attorney, Agent, or Firm*—Lackenbach Siegel Marzullo Presta & Aronson

[57] ABSTRACT

The present invention relates to an emergency supervisory system which comprises a plurality of supervisory apparatus provided for respective supervisory regions and connected in parallel with each other to signal lines derived from a central signal station; and switching devices which are provided at positions for separate the supervisory apparatus from each other and adapted to be closed normally and opened upon detection of short-circuiting to separate the supervisory apparatus adjacent thereto from the lines, thereby to supervise an emergency such as a fire through one or both of the signal lines.

7 Claims, 7 Drawing Sheets

EMERGENCY SUPERVISORY SYSTEM

FIELD OF THE INVENTION AND RELATED ARTS

This invention relates to an emergency supervisory system wherein a plurality of emergency supervisory means provided for respective supervisory regions are connected to signal lines derived from a central signal station to supervise an emergency such as a fire, a gas leak, etc. from one or both ends of the signal lines to discriminate such an emergency.

In a conventional emergency supervisory system for supervising an emergency such as a fire, a plurality of fire detectors provided for respective supervisory regions are connected to a signal line derived from a central signal station, so that the central signal station imparted with a calculation function makes fire determination on the basis of detection data obtained from the respective fire detectors through the signal line.

With such an arrangement of the conventional emergency supervisory system, when the signal line is short-circuited, all of the detectors will be fallen in such a condition in which they can not transmit the detection data to the central signal station. That is, the detection data from all of the fire detectors connected to the signal line can not be received by the central signal station and also the signal line is cut off when the short-circuiting has been detected to prevent flowing of the short-circuited current.

Thus the conventional system can not be expected as a reliable fire detecting or alarming system.

OBJECT AND SUMMARY OF THE INVENTION

This invention has been made to solve the problems involved in the conventional system and it is an object of the present invention to provide an emergency supervisory system which is capable of surely and stably effecting supervision of an emergency such as a fire etc. even when a short-circuiting trouble occurs.

It is an another object of the invention to provide an emergency supervisory system, in view of that it is now increasing a fire detector or any other terminal equipment in which a micro computer or micro computers are provided, which is capable of maintain some predetermined voltage by which the micro computer will keep in a normal state to prevent its abnormal action within from the switch-on by the powered-on of the power source to the normal operating state to provide a normal source voltage.

The present invention features an emergency supervisory system which comprises a plurality of supervisory means provided for respective supervisory regions and connected in parallel with each other to signal lines derived in loops from a central signal station; and switching means which are provided at positions for separate the supervisory means from each other and adapted to be closed normally and opened upon detection of short-circuiting to separate the supervisory means adjacent thereto from the lines, thereby to supervise an emergency such as a fire through one or both of the signal lines.

PREFERRED EMBODIMENT OF THE PRESENT INVENTION

Figure 1:
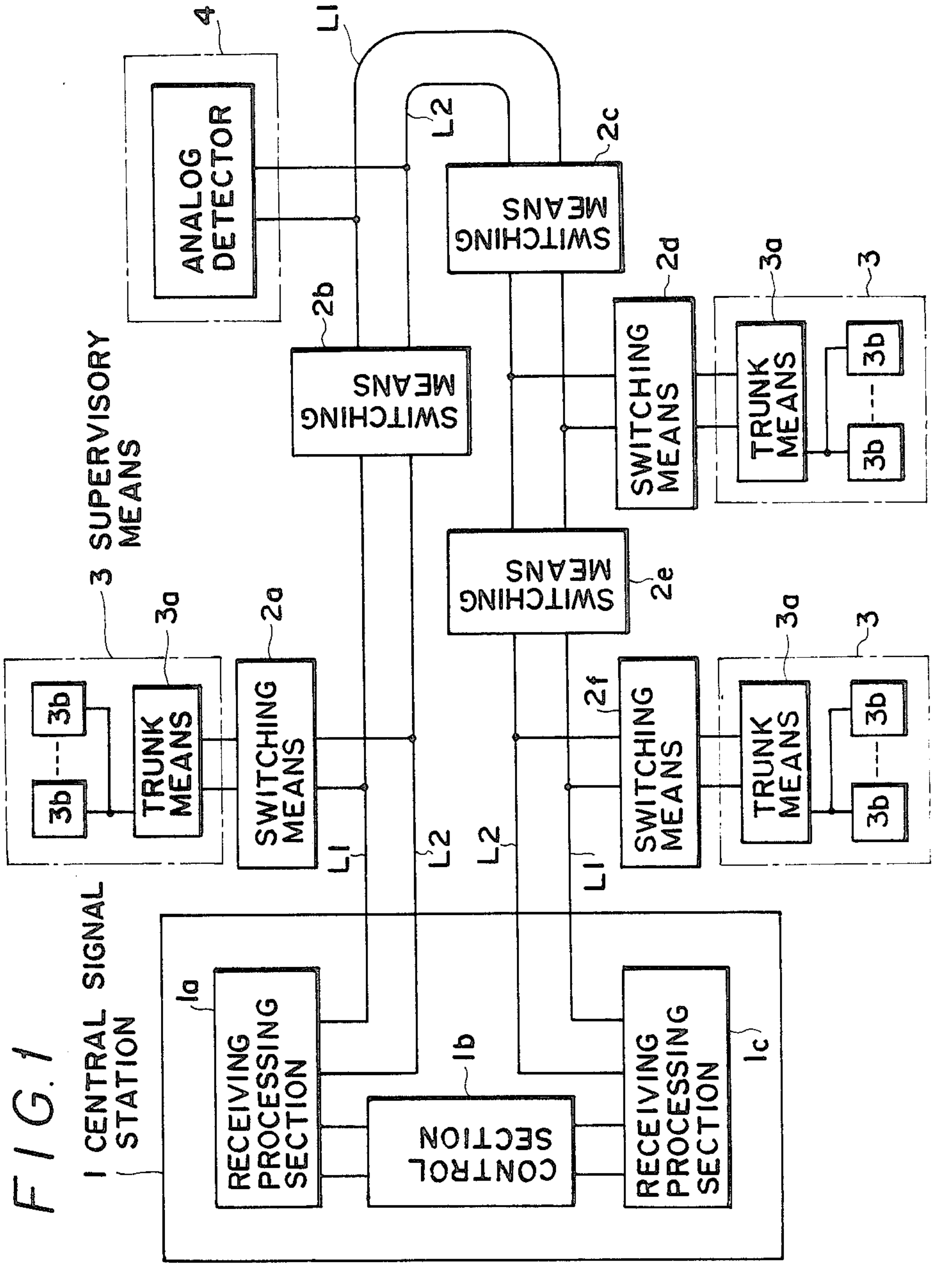
FIG. 1 is a block diagram of an entire system of one embodiment of the present invention.

Preferred embodiment of the present invention will now be described referring to the drawings.

FIG. 1 is a block diagram of an entire system of one embodiment of the present invention.

The formation of the embodiment will be first described. 1 is a central signal station. Signal lines L1 and L2 are derived from the central signal station so as to extend to a plurality of supervisory regions and the signal lines are returned to the signal station 1 to form loops.

Supervisory means provided for the respective supervisory regions are connected in parallel with each other to the signal lines L1 and L2. More specifically, a supervisory means 3 is connected to the looped signal lines L1 and L2 through a switching means 2*a*. The supervisory means 3 is comprised of a trunk means 3*a* and a plurality of detectors 3*b* for detecting a fire, a gas leak or the like which are connected to the trunk means 3*a*.

An analog detector 4 functioning as a supervisory means for supervising an emergency is connected in parallel to the looped signal lines L1 and L2 at a position between a switching means 2*b* and a switching means 2*c*.

Further supervisory means 3 are connected in parallel to the signal lines L1 and L2 through switching means 2*d* and 2*f* at positions between a switching means 2*c* and a switching means 2*e* and between the switching means 2*e* and the central signal station, respectively.

The trunk means 3*a* of the respective supervisory means 3 and the analog detector 4 are peculiarly assigned with addresses, respectively, and count calling pulses from the central signal station 1 and transmit accumulated detection data to the central signal station when the counted value coincides with the respective address.

In this connection, it is to be noted that the switching means 2*a*, 2*b*, 2*c*, 2*d*, 2*e* and 2*f* are provided at positions for separating the plurality of supervisory means from each other.

Each of the switching means 2*a*, 2*b*, 2*c*, 2*d*, 2*e* and 2*f* includes a switching section which is normally closed and is opened when short-circuiting is detected so that it drives the switching section included therein to separate the supervisory means adjacent thereto from the looped signal lines L1 and L2 when short-circuiting of the lines L1 and L2 have been detected.

The configuration of the central signal station 1 will now be described. 1*a* is a receiving-processing section which transmits a calling pulse by superposing it on a predetermined voltage EO in response to an instruction from a control section 1_b_ and receives supervision data from the supervisory means. The control section 1_b_ determines the conditions such as a fire, a gas leak, short-circuiting, etc. on the basis of the received data from the receiving-processing section 1_a_. When the control section 1_b_ determines short-circuiting or disconnection, it drives another receiving-processing section 1_c_ which is provided independently of the receiving-processing section 1_a_. The receiving-processing section 1_c_ in normally in an OFF state and it initiates a receiving-processing operation in response to an instruction from the control section 1_b_ which has determined short-circuiting or disconnection. With this respect, a calling pulse is superposed on the predetermined voltage in response to the instruction from the control section 1_b_ to transmit the calling pulse to the signal lines L1 and L2 from the opposite ends thereof to receive the supervision data from the supervisory means 3, . . .

Figure 2:
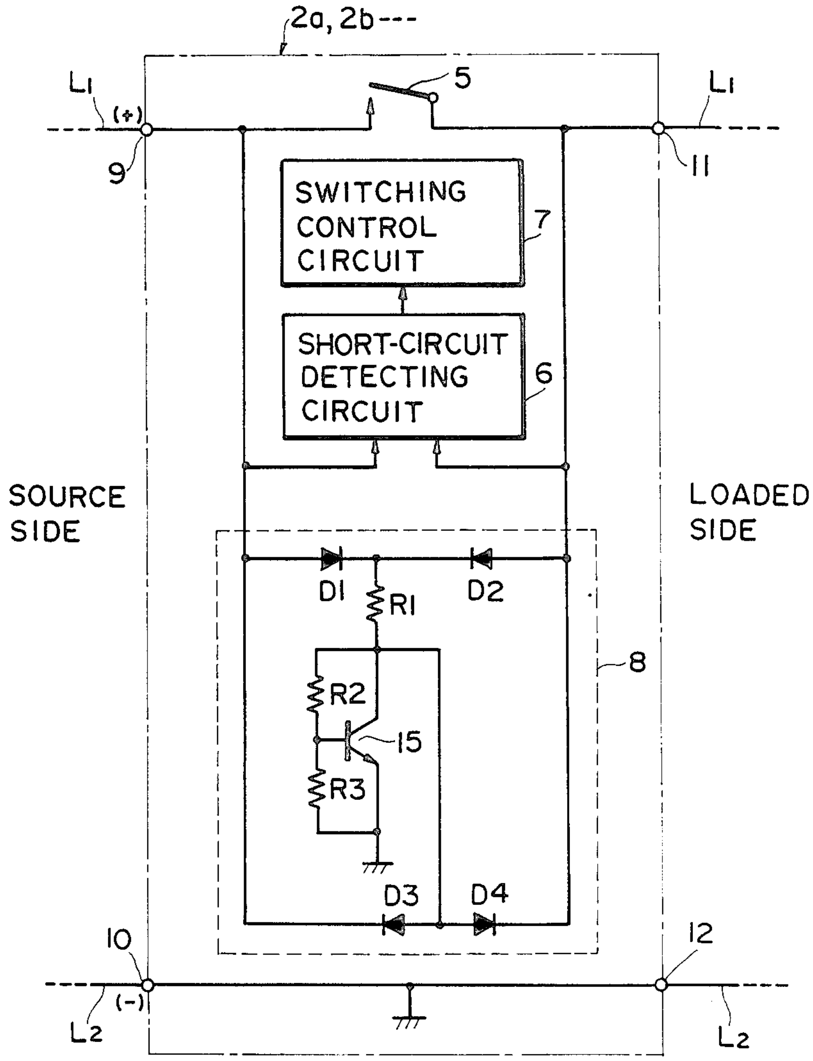
FIG. 2 is a block diagram illustrating the first example of the switching mechanism shown in FIG. 1.

FIG. 2 is a block diagram illustrating a specific example of the switching means 2_a_, 2_b_ . . .

The formation will be first described. Terminals 9 and 10 of the switching means 2_a_, 2_b_ . . . are connected to a power source of the central signal station 1 by the signal-power lines L1 and L2, respectively. Terminals 11 and 12 of the switching means are connected to a load through the signal lines L1, L2, respectively.

A switch 5 is connected to a line between the terminals 9 and 11 which are connected to the signal line L1. The switch 5 may, for example, be an analog switch using FET or the like. A line voltage across the inserted switch 5 is input to a short-circuit detecting circuit 6.

The short-circuit detecting circuit 6 generates a detection output to a switch control circuit 7 when at least one of the line voltages input is lowered to below a threshold voltage Vth set for detecting short-circuiting in the lines.

The switch control circuit 7 generates a control signal for closing the switch 5 when no detection output is obtained from the short-circuit detecting circuit 6 and generates a control signal for opening the switch 5 when the short-circuit detection output is obtained.

8 is a constant voltage supplying circuit which applies a predetermined voltage V1 to the lines connected to the inserted switch 5.

The constant voltage supplying circuit 8 is connected to the lines to which the switch 5 is connected and the signal lines derived from said lines are connected through diodes for breaking a reverse current. The junction point of the diodes D1 and D2 is connected in series to a transistor 20 through a resistor R1 so as to apply a voltage divided by resistors R2 and R3 to the base of the transistor 20. The collector of the transistor 20 is connected to the lines to which the switch 5 is connected, through reverse-current preventing diodes D3 and D4, respectively.

In the constant voltage supplying circuit 8 as described above, if the collector voltage of the transistor 20 is assumed to be Vc, the base-emitter voltage Vbe of the transistor 20 is:

$$Vbe = \{R3/(R2+R3)\} \cdot Vc \qquad (1)$$

If the forward voltage of the diode D4 is assumed to be Vf, the forward voltage Vf of the diode D4 is substantially equal to the base-emitter voltage Vbe. If Vf=Vbe, the voltage V1 to be applied across the terminals 11 and 12 of the load side will be:

$$V1 = Vc - Vf \qquad (2)$$

If the collector voltage Vc obtained by the formula (1) is substituted into the formula (2), the voltage V1 to be applied across the terminals 11 and 12 of the load side will be expressed by:

$$V1 = Vbe \cdot R2/R3 \qquad (3)$$

As apparent from the formula (3), the voltage V1 output from the constant voltage supplying circuit 8 is determined by the resistors R2 and R3 provided in the base circuit of the transistor 20 since the base-emitter voltage Vbe is constant (for example, 0.6 V). If an operating voltage pf a microcomputer provided in the terminal load connected across the signal lines L1 and L2 derived from the terminals 11 and 12 is assumed to be Va, the voltage applied by the constant voltage supplying circuit 8 to the lines across the switch 5 is set at a predetermined voltage higher than the threshold voltage Vth set for detecting short-circuit and lower than an operating voltage Va of terminals to which no load is connected.

More particularly, if the operating voltage Va of the micro computer provided in the terminal load is assumed as 5 V, the voltage V1 to be applied to the lines across the switch 5 by the constant voltage supplying circuit 8 is set at 2 to 3 V. The threshold voltage Vth for detecting short-circuiting is therefore set at a voltage of, for example 1 V or lower.

Therefore, in said formula (3), if the voltage Vbe is set as 0.6 V, and, resistances of the resistors R2 and R3 are set as $R2=4\times R3$, there can be obtained a low voltage as low as V1=2.4 V in spite of the value of the source voltage Eo.

Although the foregoing description is made for an example in which the terminals 9 and 10 are connected to the power source and the terminals 11 and 12 are connected to the load, similar low voltage V1 can be applied to the lines on the load side if the terminals 11 and 12 are connected to the power source and the terminals 9 and 10 are connected to the load.

The operation of the switching means shown in FIG. 2 will be described.

When the electric power circuit provided in the central signal station is powered on, a predetermined source voltage is applied between the terminals 9 and 10. The switch 5 is off so that the source voltage is provided to the transistor 15 through the diode D, and the resistor R, in the constant voltage supplying circuit 8. Further any direct provision through the constant voltage circuit 8 to the loads connected between the signal lines L1 and L2 which are connected to the terminals 11 and 12, because the diode D2 is arranged to the loaded side.

Transistor 15 which is supplied electric power through the diode Di and the resistor R1 is turned on by base—bias based on the partial voltage caused by the resistor R2 and R3. The collector voltage Vc of the diode D4 when passing through the diode D4. And the voltage Vf is applied the voltage Ve which is given by the formula(3) between the terminals 11 and 12 of the loaded side.

Further the diode D3 is in the state of shut-off because the voltage of the collector side Vc is in small value.

Thus the voltage V1 which is provided from the constant voltage supplying circuit 8 and has a relative small value is applied between the signal lines L1 and L2 when just after the source has powered on. Even if the voltage V1 is applied as the source voltage to any terminal loaded equipment, such a sensor or a trunk, and the sensor or a trunk include a micro-computer, the voltage V1 is lower than the active point voltage Va of the micro-computer. Thus the micro computer is not activated, and a reckless run of the micro-computer caused by a tottering of the source voltage and an accidental action of the micro-computer caused by no initial reset.

Nextly when the voltage Ve is applied to the loaded side from the constant voltage supplying circuit 8, the voltage Ve is also input to the short-circuit detecting circuit 6 as the line voltage of the loaded side. As the voltage V1 is higher than the threshold voltage Vth set in the short-circuit detecting circuit 6, the circuit 6 does not detect any short-circuit state. As the result of this no detection, the switch control circuit 7 closed the switch 5 after a little later from the output of the voltage V1 from the constant voltage supplying circuit 8. And thus the normal source voltage is supplied to the loaded side.

When between the line L1 and L2 each connected to the terminals 11 and 12 is short-circuited, the voltage between the terminals 11 and 12 is lowered to 0 volt, and the line voltage to the short-circuit detecting circuit 6 is lower than the threshold voltage Vth.

Hereupon the circuit 6 outputs the detecting output to the switch control circuit 7 so as to open the switch 5 to apart the loaded side lines in the portion where the short-circuit is occurred from the power source side.

Namely because the predetermined low voltage which is less than the activated point of the terminal loads is applied to the lines of the loaded side, a reckless run of a micro-computer included in the terminal equipment is surely prevented when just after the powered on of the power source.

And it can be achieved to keep the supplying voltage from the power source to the loaded side in a constant value when just after the powered on in spite of number of the connected loads.

Further the state of switching-on is surely occurred as a result of a cancellation of the short-circuit detecting action by the short-circuit detecting means which is caused by supplying of a low voltage to the powered-on of the power source. And it can be surely achieved to start normally the action of the micro-computers included in the terminal equipments by initial resetting.

Figure 3:
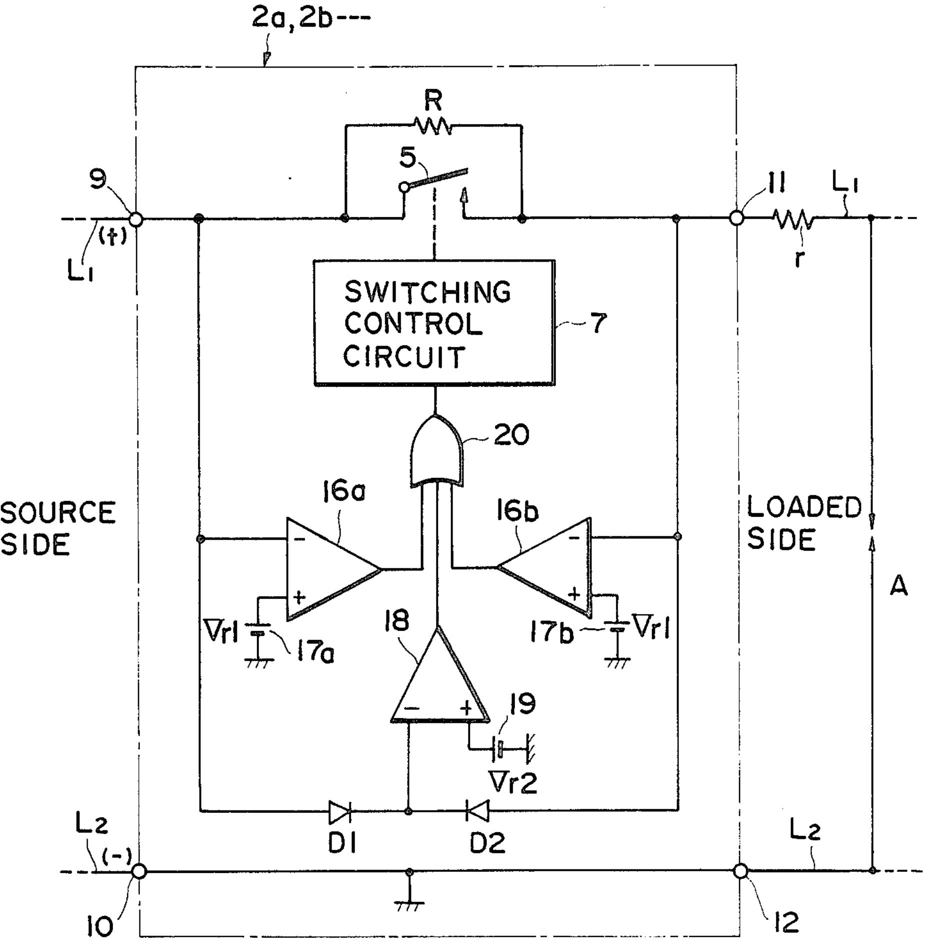
FIG. 3 is a block diagram illustrating the second example of the switching mechanism.

FIG. 3 shows a block diagram of the second example of the switching mechanism. Same parts with the previous example shown in FIG. 2 are illustrated with the same numeral number and duplicated descriptions for the parts are abridged.

The switching means also have the switch 5 same to the previous example. The resistor R is connected parallel to the switch 5. The resistor 5 has a resistance of several tens K-ohm for preventing a large short-circuited current in the signal station caused by short-circuited between the signal lines in the loaded side.

Both signal lines between which the switch 5 is connected are inputted each to the minus terminal of the comparators 16*a*, 16*b*. These comparators 16*a* and 16*b* are provided as first detecting means of short-circuit. And the first threshold voltage Vr1 is set at each the plus terminals of the comparators 16*a* and 16*b* by the criterion voltage sources 17*a* and 17*b*.

The threshold voltage Vr1 is set smaller than the line voltage V1 which is the line voltage when the electric source power is applied to the loaded side through the resistor Ro. That is, the source voltage Vp which is applied to the loaded side signal line through the resistor R when the switch 5 is in the off state is defined by a combined impedance of terminal equipments such as sensors and trunks which are parallelly connected to the loaded side signal lines from the terminals 11 and 12. This voltage Vp might be 2 to 3 volts normally. Thus the threshold voltage Vr1 is set as Vr1=1.0 V which is smaller than the voltages of both side of the switch 5 are both input to the minus terminal of the comparator 18 through diodes D1 and D2. The comparator 18 is provided as the second short-circuit detecting means.

At the plus terminal of the comparator 18 the second threshold voltage Vr2 is set by the criterion voltage source 19. The second threshold voltage Vr2 is set as larger than the source voltage Vp which is applied through the resistor R when the switch 5 is in off state. And the threshold voltage Vr2 is set as higher voltage value than the voltage Vs. The voltage Vs is applied between the loaded side terminals 11 and 12 when short-circuit is occurred in the switch 5 is in on state and which is defined by the short-circuit current $i_s$ and the loaded side line resistance r. The second threshold voltage Vr2 is smaller than the source voltage Vc which is applied between the terminals 9 and 10 from the central signal station 1.

More detailed, the loaded side lines voltage Vp which is applied when the switch 5 is in off state through the resistor R takes 2 to 3 volts. And the voltage Vs takes normally 4 to 10 volts when the switch 5 is in on state. In this case the threshold voltage Vr2 is set as Vr2=11 V.

Outputs from the comparators 16*a*, 16*b* and 18 are input to the OR-gate 20. The switching control circuit 7 controls on-off of the switch 5.

Namely the switching control circuit 7 controls the switch 5 to be in on state when no high level detecting output is output from anyone of the comparators 16*a*, 16*b* and 18. While the circuit 7 controls to change the switch 5 to be in off state when anyone of the comparator 16*a*, 16*b* or 18 outputs the high level output.

The operation of the example shown in FIG. 3 will now be described.

In case no short-circuit occurred between the loaded side lines connected to the terminals 11 and 12, when the source voltage Vc is applied between the terminals 9 and 10 by powered on of the central signal station, in this situation the switch 5 is in off state, the voltage 2 to 3 volts which is defined by the parallel combined impedance of the terminal equipments parallelly connected to the loaded side lines and by the resistance R is applied. Thus the comparator 16*a* outputs low level output because the line voltage input to the comparator 16*a* is the source voltage Vc. And the output of the comparator 16*b* is also in low level because the input line voltage is 2 to 3 volts to the comparator 16*b*. The line voltage of the source side input to the comparator 18 through the diode D1 is Vc, that is the source voltage, and the line voltage input to the comparator 18 through the diode D2 is Vp which is the loaded side line voltage of 2 to 3 volts. The diode D1 is biased forwardly and is triggered. The diode D2 is biased reversely and is kept in off state. The comparator 18 is input only the source side line voltage Vc which exceed the threshold voltage Vr2 set by the criterion voltage source 19 so as to output low level output. The OR-gate 20 outputs low level output because all of the inputs to the OR-gate from the comparators 16a, 16b and 18 are low level. Thus the switching control circuit 7 changes the state of switch 5 from off state to on state after the predetermined time lag from the power on the electric source.

While the short-circuit may occurred at the point A on the loaded side line at when the power is put on, and the source voltage Vc is applied between the source side terminals 9 and 10, the applied voltage between the loaded side terminals 11 and 12 might be a divided voltage of the source voltage Vc by the line resistor R has a high value such as a several tens of kilo ohms, while the line resistor r has a small value such as a few ohms to a several tens of ohms, the short-circuit current flows in the lines which have resistance r. The result of such short-circuit current flowing, the voltage between the terminals 11 and 12 lowered to minute voltage or to almost zero volt. This loaded side voltage is input to the comparator 16b. The comparator 16b detects the short-circuit by comparing the input voltage and the first threshold voltage Vr1. And the comparator 16b will outputs a high level output to the switching control circuit 7 through the OR-gate 20. The switching control circuit 9 will control the switch to keep the off state thereof.

While the short circuit may occurred at the point A on the loaded line when the source voltage Vc is normally applied through the switch 5 being in the on state, the short-circuit current $i_s$ and the short-circuit voltage Vs which will be defined by the line resistance r of two line from the terminal 11 to the point A. The voltage between the source side terminals 9 and 10 lowered to the voltage which may be defined as the voltage Vs plus the dropped voltage by the inner resistance of the switch 5. Thus the source side line voltage will be higher than that of the loaded side line voltage by the dropped voltage by the inner resistance of the switch 5. Thus the diode D1 is biased forwardly so as to triggered while the diode D2 is biased reversely so as to kept its off state, the line voltage is input to the comparator 18. The comparator 18 will output the high level output by comparing the input voltage and the second threshold voltage Vr2 being set by the criterion voltage source 19. The high level output is given to the switching control circuit 7 through the OR-gate, the control circuit 7 is change the state of the switch 5 from on to off state so as to separate the area of the short-circuited loaded side line from the source side line.

Further although the description is also made for an example in which the terminal 9 and 10 are connected to the power source and the terminals 11 and 12 are connected to the loaded side, the reversed terminal connection can also be made as the prior examples and is capable of the short-circuit detection.

Namely when the short-circuit may occurred when the switching means being inserted in the line is in on state and even if the large line voltage which is higher than the first threshold voltage being depend on the loaded side line resistance may occurred, the loaded side line voltage in the short-circuit state will be lower than the second threshold voltage Vr2. Thus the short-circuit detection may be carried out surely and the short-circuited loaded line will be separated from the source side line despite being or not the loaded side line resistance. That is, this embodiment is characterized by the two different threshold voltages are set for comparing the line voltage if the short-circuit was occurred in the on-state and off state of the switch 5, and for such comparing the comparator 16a and 16b supervise the line voltage to detect the short-circuit when the switch 5 is being in off state and also the comparator 18 supervise the line voltage to detect the short-circuit.

Figure 4:
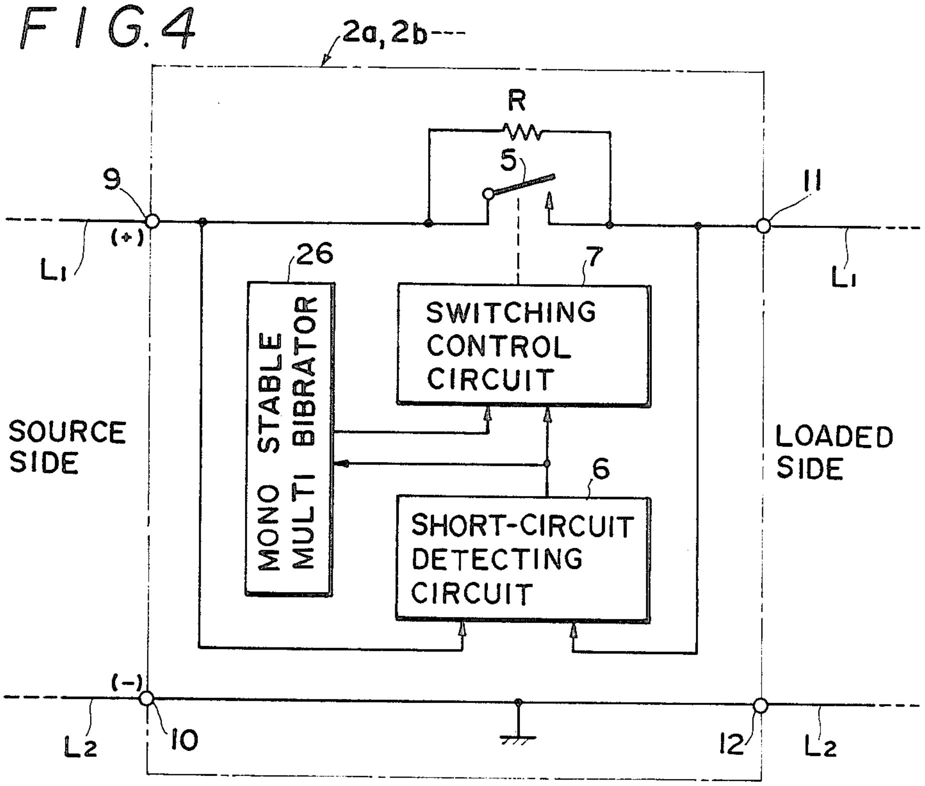
FIG. 4 is a block diagram illustrating the third example of the switching mechanism.

FIG. 4 shows the third example of the switching means. In this example the switch 5 and the resistor R which has a high resistance such as a several tens of kilo ohms. In this example, the respected description for the same or similar part of the previous example will be omitted.

In this example, the mono stable multi vibrator 26 is provided which may be triggered by the detection output from the short-circuit detecting circuit 6 so as to output the inhibit signal which inhibit to change the state of the switch 5 by the switching control circuit 7 to be on state. This inhibit time will be set to allow secure initial reset for CPU included in the terminal equipment when the power is applied soon after the instant power off cause by the short-circuit.

Of course it is not restricted to the mono stable multi vibrator 26 as the inhibiting means and as that means any circuit or device can be employed as far as they have the same or the similar function with the vibrator 26.

Figure 7:
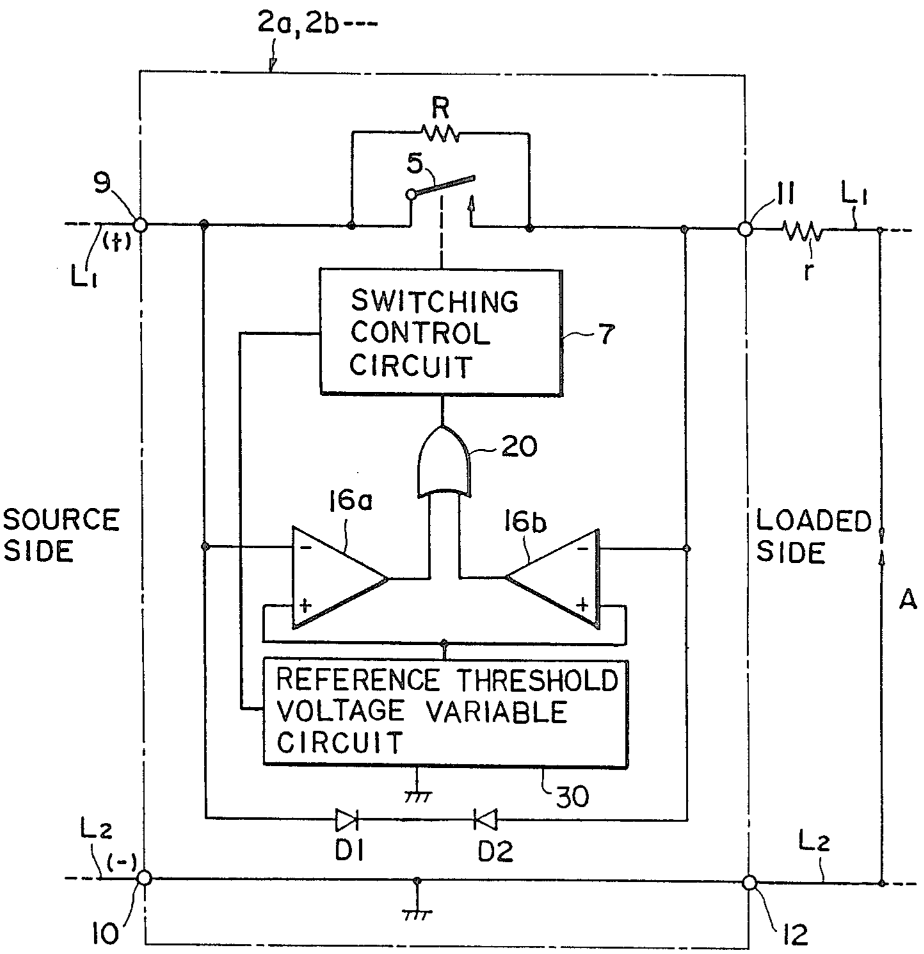
FIG. 7 is a block diagram illustrating the another example of the switching mechanism.

FIG. 7 shows the another example of a switching means which can perform substantially the same function with the example of FIG. 3. Detaily in this example, the comparator 18 as the second short-circuit detecting means is omitted and as the short-circuit detection means the comparators 16a and 16b are employed. However a reference threshold voltage variable circuit 30 is provide instead of the reference voltage source 17a and 17b for changing the reference threshold voltage when the on or off signal of the switching control circuit 7 is input. And further the diode D1 and D2 are omitted too.

Figure 8:
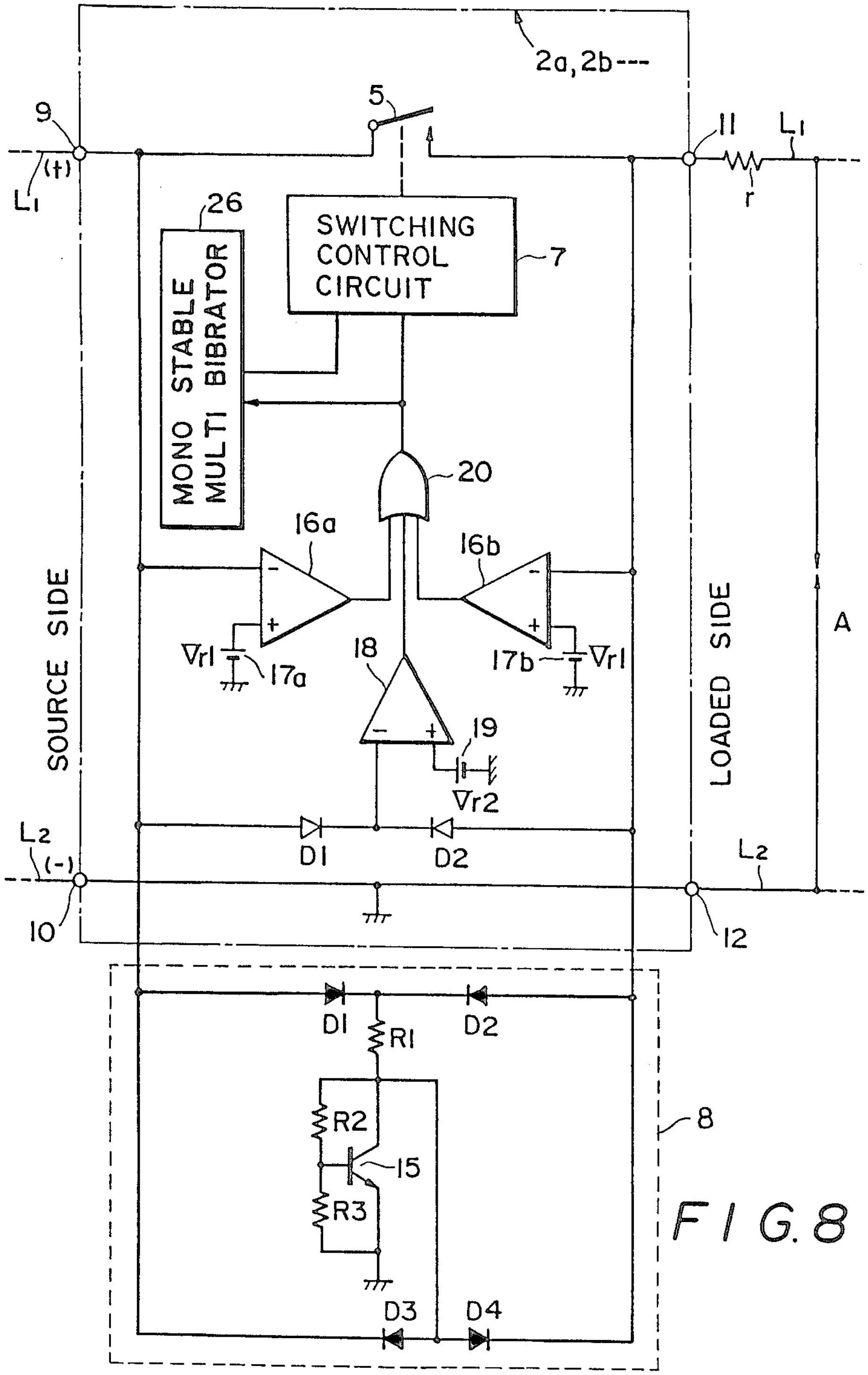
FIG. 8 is a bock diagram of more another switching mechanism in which the function of the examples shown in FIGS. 2, 3 and 4 are included.

In FIG. 8 more other example of a switching means which has the function combined those of the first, second and the third examples as described above.

In this example, as the short-circuit detecting circuit the one shown in FIG. 3 is employed. And the constant voltage supply circuit 8 of the FIG. 2 is combined with the short-circuit detecting circuit. And also the mono stable multi vibrator 26 is arranged as the inhibiting means between the OR gate 20 and the switching control circuit 7. Thus this example shows the combined function all of the above mentioned examples of the switching means. Of course the example of FIG. 7 can be employed as the short-circuit detecting circuit.

Figure 6:
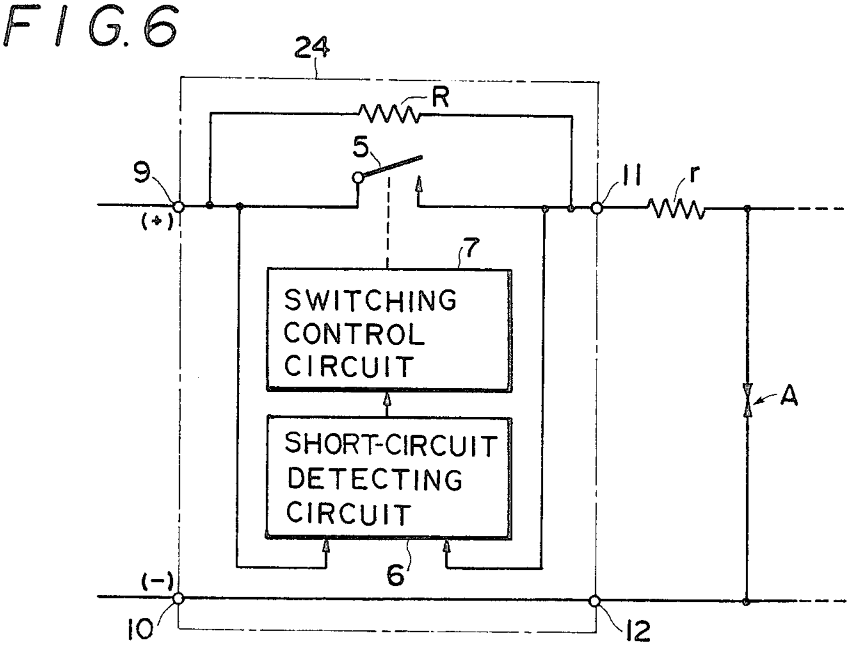
FIG. 6 is a block diagram of another switching mechanism employing in the system of FIG. 5.
Figure 5:
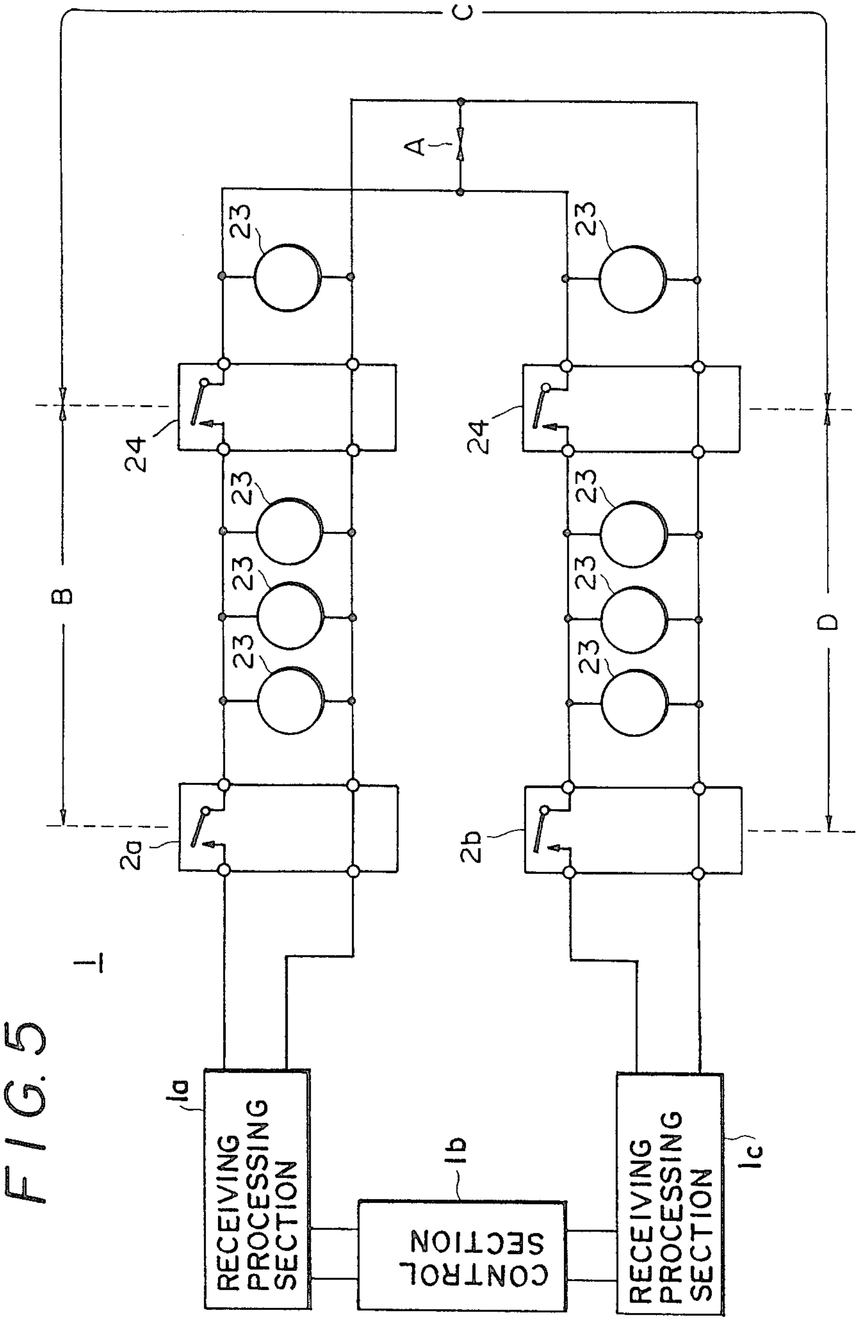
FIG. 5 is a block diagram of an entire system in which the switching mechanism shown in FIG. 4 is employed.

FIG. 5 in which the system employing the switching means of the above mentioned examples will now be described. In this system of FIG. 5, the switching means 2a and 2b of FIG. 4 are provided at the near side to the central station 1 in the looped lines, and the other switching means are provided at the far side to the central station 1. These other type of switching means 24 are illustrated in FIG. 6 so as to show their construction. That is, the other type switching means 24 includes the switch 5, the short-circuit detecting circuit 6, the switching control 7 and the resistor R so as to provide the source voltage by-passing the switch 5 to the line which is positioned in a down stream side of the switch 5 and also to the trunk means 3, when the power source is turned on.

However if the switching means 24 shown in FIG. 6 is employed for all of the switching means, the line voltage of the region in which the short-circuit is not occurred may also be down to zero volt when the short-circuit is occurred at point A. Thus the reckless run of CPU might be happened in the sensor or the terminal equipment cause by a instant power off which will be occurred soon after separation of the short-circuited region by the switching means 24.

The operation of the system will now be described. When the central signal station 1 is powered on, the source voltage is applied to the loaded side line through the resistor R because the switch 5 is in off state. The loaded side line voltage is defined from divided voltage by the combined impedance of the resistor R. The resistance value of the resistor R should be set to be lower than the initial reset level of CPU included in the equipment 23.

As the result, the line voltage applied to the loaded side through the resistor R is larger than the threshold voltage Vth set in the short-circuit detecting circuit 6. At this time the short-circuit detecting signal. The switching control circuit 7 may change the state of the switch 5 to on state after predetermined time lag from the power application.

That is, when the switch 5 of the switching means *2a, 2b* being arranged at the near end to central signal station 1, the source voltage will be applied to the loaded side line from the central signal station 1, and will also be applied to the loaded line in region C through the switching means 24 of the resistor R. This loaded side line voltage will be below the reset level being defined by the combined impedance of the terminals of the CPU included in the terminal equipment and also exceed the threshold voltage Vh set in the detecting circuit 7 is thus achieved to operate so as to change the state of the switch in on state. As the result such an action, the source voltage may be applied to the line all of the region B, C, and D.

While when the short-circuit accident may occur at the point A in the region C, the line voltage of not only the region C but also region B and D will be lowered to zero volt. In this result the short-circuit detecting circuit 6 in the each of the switching means *2a, 2b, 24a,* and *25b* may detect the short-circuit and it will output as the detecting signal. The switching control circuit 9 changes the state of the switch 5 into off state.

At this time, in the switching means *2a, 2b,* the mono stable multi vibrator 26 is triggered by the detecting signal output from the short-circuit detecting circuit 6 so as to output the inhibit signal to the switch control circuit. Therefore the switch 5 of the switching means 24 is changed its state to the off state, and the short-circuited region C will be separated from the normal conditional region B and D to which the source voltage (which is lower than the reset level of CPU) which will be defined by the resistors R of the switching means *2a, 2b* and the combined impedance of the terminal equipment 3 is applied. Because of this voltage application, the detection output of the short-circuit detecting circuit will be disappeared. But the inhibit signal of the mono stable multi vibrator 26 may be applied to the switching control circuit 7 to inhibit the change of the state of the switch for a predetermined time interval, the circuit 7 keep the state of the switch 5 in off state even if the short-circuit detecting circuit 6 does not output the detecting signal. And when just soon the disappearance of the output from the vibrator 26 after the predetermined time has past from the short-circuit detection, the control circuit 7 changes the state of the switch 5 to on state.

Therefore there will be no provision of the normal source voltage application to the terminal equipments 23 which are parallelly connected in the regions B and D for a while. Therefore the voltage of CPU which is included in the terminal equipment 23 is lowered to the divided voltage by the resistor R and the combined impedance of the terminal equipments which are parallely connected between the lines in the regions B and D. And the source voltage which is applied to the loaded side through the resistor R set below the operable point of the CPU of the terminal equipment 23, such as about 2 and 3 volts.

Therefore, at the rising point of the source voltage when the switch 5 is turned off after the disappearance of the output from the mono stable multi vibrator 26, the CPU will be reset initially, which is similar to the initial reset caused by power on of the central signal station 1. It can be achieved to make an initial reset to start the operation of CPU, in a normal condition at when the restoration of the line voltage after the detection of short-circuit.

Further, to construct the system as of shown in FIG. 5, other types of switching means *2a* and *2b* which is shown in the prescribed examples can be employed. And these means should not be required to be included in the central signal station 1. Of course for all of the switching means, the same type of the switching means *2a* and *2b* can be employed.

In this example, as the same to the previous examples, CPU may be surely initially reset. Especially for CPU which is provided in no short-circuited region reckless run at when he instant off of the power source voltage caused by the short-circuit can be surely prevented.

Further as the switch 5 and the switching control circuit 7, a latching relay circuit can be employed as the switch included in that relay circuit. This switch will be act just same as the switch 5 and save the current consumption.

And further in FIGS. 1 and 5 show looped signal line example. However the present invention can be applied to any system which has signal lined extend to one direction having the end terminal resistance equipment such as resistor.

We claim:

1. An emergency supervisory system comprising: a central signal station and a pair of power, lines connected thereto in a loop for receiving therefrom a supply voltage and call signals corresponding to individual addresses;
   - a plurality of individual supervisory means each having a respective address and connected in parallel to said lines for receiving therefrom said supply voltage and a respective call signal corresponding to the respective address thereof;
   - each supervisory means comprising detector means disposed in a corresponding supervisory region for monitoring physical variables for emergency conditions, and trunk means for receiving data acquired by said detector means relating to the physical variables being monitored; such trunk means further receiving the corresponding call signals as instructions to transmit the acquired supervisory data to the central signal station;
   - a plurality of switching means respectively connecting said plurality of supervisory means to said power lines in parallel; each switching means comprising detection circuitry connected to one power line for electrically detecting the presence and absence of fault conditions on a corresponding load side thereof, a switch connected to said one power line, and switching control circuitry for actuating said switch to an open state for effectively disconnecting the corresponding supervisory means from said one power line to thereby electrically isolate it from the system when a fault condition is detected and for actuating the switch to a closed state maintaining connection of the corresponding supervisory means to the power line when the absence of a fault condition is detected; and means in the central signal station for receiving the supervisory data transmitted by the supervisory means and for effecting transmission of said call signals and said supervisory data to an opposite end of the power line loop other than the end thereof in use preceding the detection of a fault condition when any of said switching means determines a fault condition and has disconnected a supervisor means;

said switching means detection circuitry comprising: a first short-circuit detecting circuit for detecting a short circuit between the power lines when the line voltage at the connection of said switch to said one power line is lower than a first predetermined voltage which is lower than the line voltage following such connection; and a second short-circuit detecting circuit for detecting a short circuit between the power lines when the line voltage at such connection is lower than a second predetermined voltage which exceeds the line voltage following such connection; said switching control circuitry comprising a switching control circuit responsive to outputs of the first and second short-circuit detecting circuits.

2. An emergency supervisory system according to claim 1, in which the switching control circuit comprises means for generating a first control output for activating the switch to an open state when a fault condition is detected and means for generating a second control output for activating the switch to a closed state when the absence of a fault condition is detected.

3. An emergency supervisory system according to claim 2, in which said switching means comprises inhibiting means to inhibit a change of state of said switch, thereby to effect a lag in changes of state of the switch.

4. An emergency supervisory system accirding to claim 3, in which said inhibiting means to inhibit a change of state of said switch is a mono-stable multivibrator.

5. An emergency supervisory system according to claim 1, further comprising inhibiting means receptive of the short-circuit detecting circuit outputs as a trigger for developing an inhibit signal output applied to said switching control circuit to delay the switching control circuit actuation of the switch for a delay period set to allow time for reset time for devices on a load side of the switching means.

6. An emergency supervisory system according to claim 1, including a resistor connected in said one power line shunting said switch to provide reduced power voltage to said one line on a load side of the switching means while normal power voltage is applied and the switch is in an open state, the resistance of the resistor having a predetermined value to keep the voltage on said one line below normal until the switch assumes a closed state.

7. An emergency supervisory system according to claim 1, in which each said switching means comprises means for developing a selected constant voltage lower than normal line voltage and for appling said constant voltage to said one power line on said load side of said switching means when said switch is an open state, said constant voltage having a preselected level for maintaining a voltage on said one power line effective to keep microcomputers on said line from erratic operations when the power line is open for a predetermined time.

* * * * *